(12) United States Patent
Nguyen

(10) Patent No.: US 6,359,856 B2
(45) Date of Patent: *Mar. 19, 2002

(54) DATA STORAGE DISC DRIVE APPARATUS WITH INTEGRAL FORCED AIR COOLING CAPABILITY

(75) Inventor: Vu T. Nguyen, Spring, TX (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/128,298

(22) Filed: Aug. 3, 1998

Related U.S. Application Data

(63) Continuation-in-part of application No. 08/775,283, filed on Dec. 31, 1996, now Pat. No. 5,793,740.

(51) Int. Cl.[7] ............................................. G11B 33/14
(52) U.S. Cl. ...................................................... 369/264
(58) Field of Search ................................ 369/264, 270; 360/97.02, 97.03, 97.04, 99.04, 99.08, 99.12

(56) References Cited

U.S. PATENT DOCUMENTS

| 4,337,491 A | * | 6/1982 | Hasler et al. | 360/99.08 |
| 4,780,776 A | * | 10/1988 | Dushkes | 360/78.12 |
| 5,793,740 A | * | 8/1998 | Nguyen | 369/264 |

FOREIGN PATENT DOCUMENTS

| JP | 59-157880 | * | 9/1984 | |
| JP | 62-175990 | * | 8/1987 | |
| JP | 4-61686 | * | 2/1992 | 369/264 |

* cited by examiner

Primary Examiner—George J. Letscher

(57) ABSTRACT

A forced flow of cooling air through a computer housing is created during operation of a specially designed data storage disc drive structure operatively disposed in the housing. The drive, which is illustratively a CD ROM drive, has a bladed carrying structure which supports a compact disc and is rotationally driven with the supported disc. Driven rotation of the bladed carrying structure creates the forced flow of cooling air within the housing without requiring additional space for a separate cooling fan therein. In two illustrated embodiments of the bladed carrying structure the created cooling air flow is generally parallel to the rotational axis of the compact disc, and in a third embodiment of the bladed carrying structure the created cooling air flow is generally transverse to the rotational axis.

10 Claims, 4 Drawing Sheets

DATA STORAGE DISC DRIVE APPARATUS WITH INTEGRAL FORCED AIR COOLING CAPABILITY

CROSS-REFERENCE TO RELATED APPLICATION

This application is a continuation-in-part of U.S. application Ser. No. 08/775,223, now U.S. Pat. No. 5,793,740 filed on Dec. 31, 1996 and entitled "CD ROM DRIVE APPARATUS WITH INTEGRAL FORCED AIR COOLING CAPABILITY".

BACKGROUND OF THE INVENTION

1. Field of the Invention

The present invention generally relates to electronic apparatus and, in a preferred embodiment thereof, more particularly relates to the removal of operating heat from the interior of an electronic device such as a computer.

2. Description of Related Art

Various electronic components used in computers, such as microprocessors, generate heat during their normal operation. If not removed from the heat-generating component, the heat raises the device temperature to a level that degrades the reliability and service life of the device, and may also adversely affect nearby components as well. This problem has become more acute in recent years due to the increasing power and speed of microprocessors, and other electronic components, accompanied by correspondingly greater heat generation.

One proposed heat dissipation solution has been to place one or more cooling fans in the computer housing and use the fan(s) to create a flow of cooling air through the housing which receives at least a portion of the component operating heat and discharges it to ambient air surrounding the computer housing. The placement of one or more cooling fans in a computer housing, however, often undesirably takes up space therein which may already be at a premium for desirable computer equipment such as CD ROM drives, multiple floppy drives, larger hard drives and the like in the housing.

An even more pressing design problem in highly compact computers, such as notebook and subnotebook computers, is that there may simply not be room for a separate cooling fan to remove component operating heat, and the designer must rely on radiation and natural convection from the exterior surface of the computer housing to remove such heat. This approach is limited, of course, by two factors—(1) the maximum exterior surface area of the computer housing available for such radiant and convective operating heat dissipation, and (2) the maximum temperature to which the exterior housing surface can be permitted to rise during computer operation before the housing, to the user of the computer, becomes objectionably hot to the touch.

As can readily be seen from the foregoing, a need exists, representatively in conjunction with a computer housing, for at least an auxiliary source of forced air cooling which does not occupy substantial housing space beyond that occupied by the various computer components therein. It is to this need that the present invention is directed.

SUMMARY OF THE INVENTION

In carrying out principles of the present invention, in accordance with a preferred embodiment thereof, a specially designed data-carrying member drive structure is disposed in a housing portion of an electronic device, representatively the CPU housing portion of a notebook computer. According to a key aspect of the invention, the data-carrying member drive structure is operative, during its rotation of an associated data-carrying member, representatively a data storage disc member such as a compact disc or a digital video disc (DVD), to create a cooling flow of air within the housing portion without requiring appreciable additional interior housing space for a separate cooling fan.

From a broad perspective, the drive structure includes a carrying structure for supporting the data storage disc; a drive mechanism for rotating the carrying structure, and its supported data storage disc, about a rotational axis; and blade members disposed on the carrying structure and operative to create the cooling flow of air in response to rotation of the carrying structure. The data storage disc drive structure of the present invention is accordingly provided, in a compact space-saving manner, with integral forced air cooling capability.

In two representative embodiments of the drive structure the cooling flow of air created thereby is directed generally parallel to the drive's rotational axis, and in a third representative embodiment of the drive structure the cooling flow of air created thereby is directed generally transversely to such rotational axis.

In the first representative axial air flow embodiment of the drive structure, the carrying structure is generally disc-shaped and has a central circular portion for supporting the data storage disc, and an annular peripheral portion positioned to outwardly circumscribe the supported data storage disc. The blade members are carried on the annular, peripheral portion and are operative to force the cooling flow of air generally axially through the annular peripheral portion in response to driven rotation of the carrying structure.

The carrying structure in the second axial air flow embodiment of the data storage disc drive structure includes a hollow cylindrical hub portion coaxially receivable in the central opening in the data storage disc and having open opposite ends. The blade members are carried within the hollow hub portion and are operative to force the cooling flow of air axially therethrough, from one of the open hub ends to the opposite open end thereof, in response to driven rotation of the carrying structure.

In the third representative embodiment of the data storage disc drive structure, the carrying structure includes a generally disc-shaped carrying member having a side upon which the data storage disc may be coaxially supported for driven rotation therewith, and a periphery circumscribing the rotational axis. The blade members are mounted on the carrying structure periphery, and the drive structure further comprises a stationary guide structure outwardly circumscribing the periphery of the carrying member.

The guide structure has an air inlet passage extending generally radially into the carrying member periphery, and an air outlet passage circumferentially spaced apart from the air inlet passage around the carrying member periphery and extending generally radially outwardly therefrom. The blade members are operative to sequentially draw air into the air inlet passage and then force the air outwardly through the air outlet passage in response to driven rotation of the carrying member about the drive's rotational axis.

As will be appreciated by those of skill in this particular art, principles of this invention, in addition to being useable in conjunction with compact discs and digital video discs, could also be advantageously utilized in conjunction with the operative rotation of other types of data-carrying members, such as the disc portions of floppy and hard drives, by engaging the data-carrying member with a rotating drive structure, and using a portion of the rotating drive structure to interact with adjacent air and create a cooling air flow therefrom.

DETAILED DESCRIPTION

Figure 1:
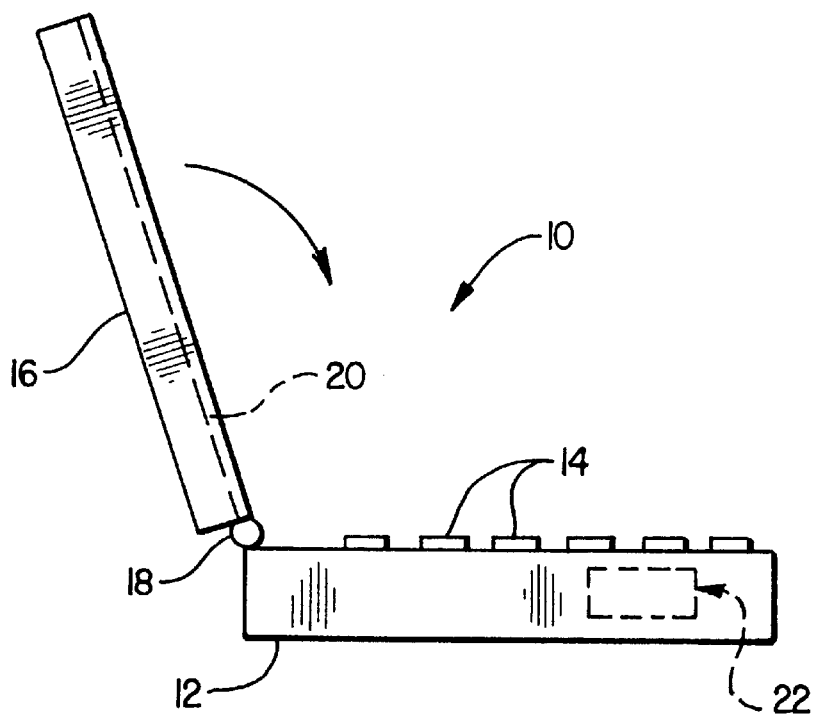
FIG. 1 is a schematic side elevational view of a representative notebook computer in which a specially designed data storage disc drive structure, having integral forced air cooling capability and embodying principles of the present invention, is operatively disposed.

Illustrated in a simplified, somewhat schematic form in FIG. 1 is an electronic device which is representatively in the form of a notebook computer 10. Computer 10 has a generally rectangular base housing 12 along the top side of which a keyboard structure 14 is operatively disposed. A somewhat thinner, generally rectangular lid housing 16 is secured to a rear top side edge portion of the base housing 12, by a suitable hinge mechanism 18, for pivotal movement relative thereto between an open use position (shown in FIG. 1) in which the lid housing 16 is generally vertically oriented to expose to the computer user a display screen 20 mounted on the bottom side of the lid housing 16, and a closed, generally horizontal storage and transport orientation in which the lid housing 16 extends across and covers the top side of the base housing 12. A conventional latch structure (not illustrated) releasably holds the lid housing in this horizontal storage and transport orientation.

Operatively disposed within the base housing 12 is a specially designed data-carrying member drive structure, representatively a CD ROM drive 22, that embodies principles of the present invention. According to a key feature of the invention, the drive 22 is uniquely provided with the integral capability of creating within the base housing 12 a forced flow of cooling air, during rotation of a novel disc-carrying portion of the drive 22, without the presence and attendant additional space requirement of a separate cooling fan structure.

While the drive 22 is representatively depicted as being a CD ROM drive useable in conjunction with compact discs, it will readily be appreciated by those of skill in this particular art that the drive 22 could also be utilized in conjunction with a variety of other types of rotatable data-carrying members such as, for example, digital video discs (DVD'S).

Figure 2:
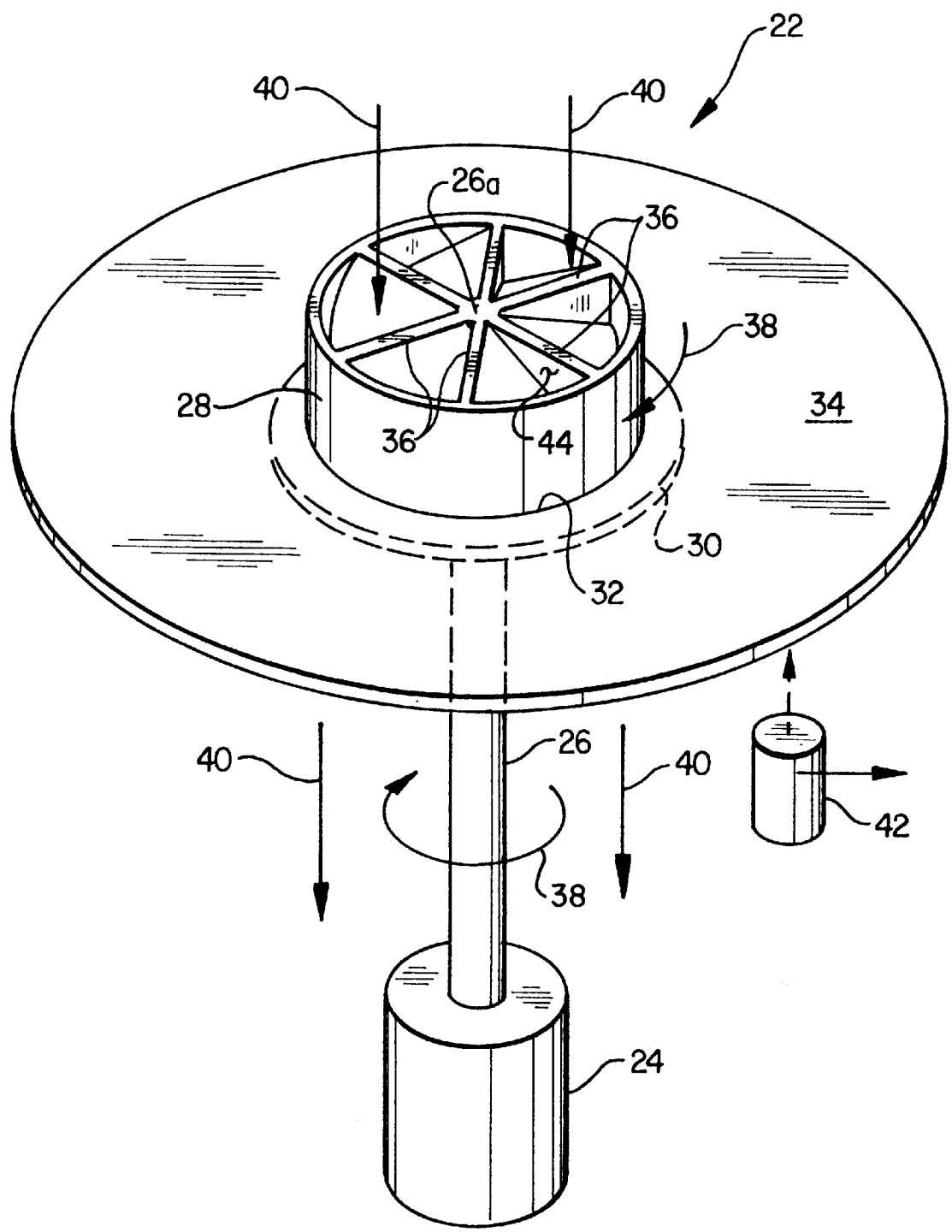
FIG. 2 is a simplified schematic perspective view of a portion of the data storage disc drive structure.

FIG. 2 illustrates in schematic perspective form the disc-carrying and rotation portion of the drive 22 which includes a variable speed electric motor 24 coupled at its upper end to a drive spindle 26. The upper end 26a of the spindle extends coaxially upwardly through a hollow cylindrical hub 28 having, at its bottom end, a radially enlarged annular flange 30. As illustrated, the hub 28 is sized to be grippingly received in the central circular opening 32 of a data storage disc, such as the illustrated compact disc 34, with a central portion of the disc 34 being supported atop the flange 30. As will be readily be appreciated, the compact disc 34 could alternatively be a digital video disc (DVD) or other type of data storage disc or member.

The upper end 26a of the spindle 26 is secured to the hollow cylindrical hub by a circumferentially spaced series of radially extending, circumferentially sloped plate members 36 that function as axial fan blades. Accordingly, during driven rotation of the hub 28, and thus the compact disc 34, as indicated by the arrows 38 in FIG. 2, a forced flow of cooling air 40 is created by the rotating blades 36 within the base housing 12 (see FIG. 1) and passed downwardly through the hollow hub 28 while a schematically depicted laser scanner 42 "reads" the spinning compact disc 34.

It is important to note that this beneficial axial flow of cooling air 40 is created within the base housing 12 without appreciably increasing the space requirement for the drive structure 22 or requiring additional housing space for a separate cooling fan structure. While the flow of cooling air 40 is shown as being downwardly directed through the interior 44 of the hollow cylindrical hub 28, it will be readily appreciated by those of skill in this particular art that the air flow 40 could be upwardly directed through the hub interior, if desired, by simply reversing the slopes of the interior hub blades 36.

Figure 2A:
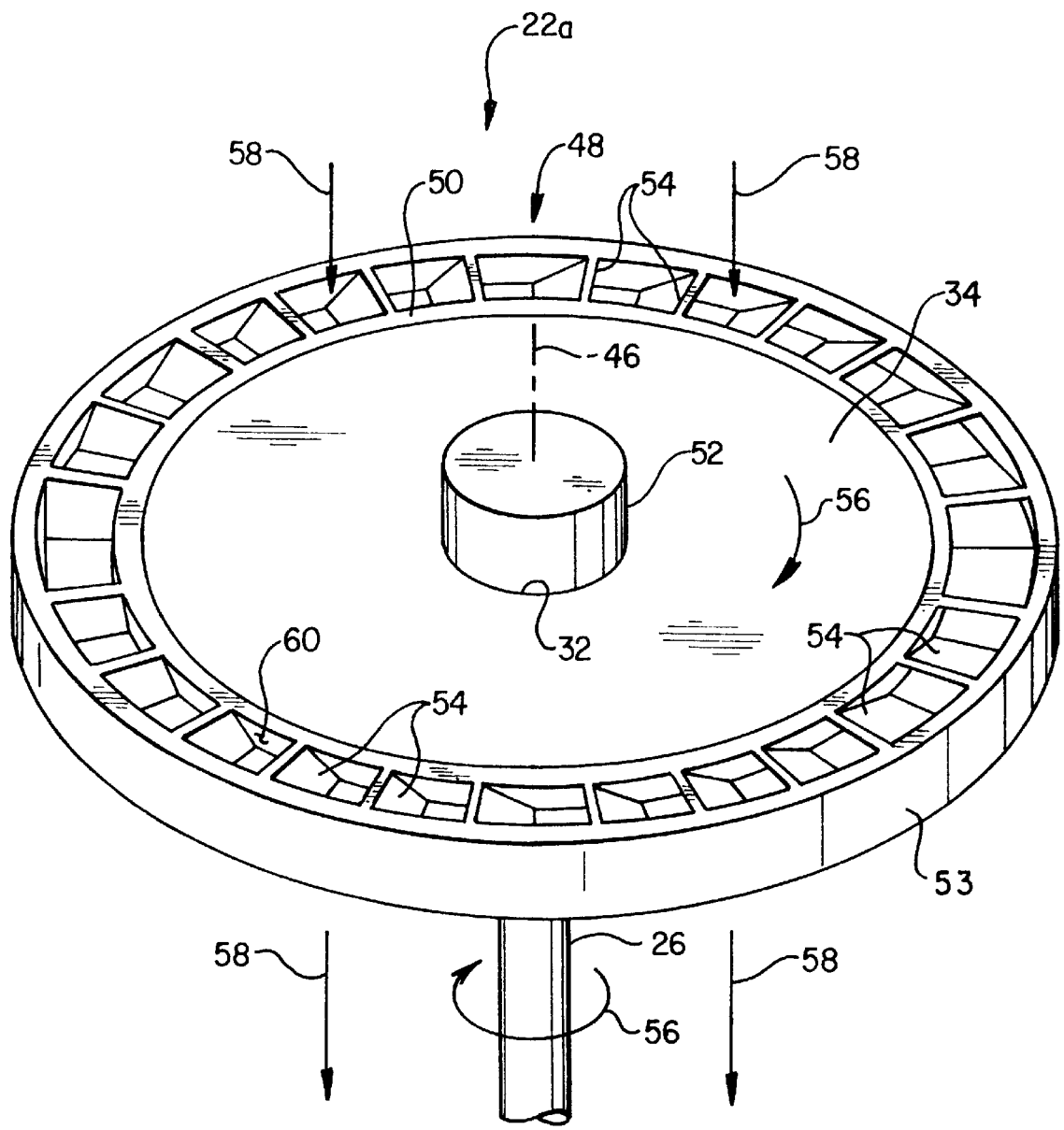
FIG. 2A is a simplified schematic perspective view of a first alternate embodiment of the disc-carrying portion of the drive structure.

Illustrated in FIG. 2A is the modified disc-carrying and rotation portion of a first alternate embodiment 22a of the previously described drive 22. This portion of the modified data storage disc drive 22a is used to support and rotationally drive the compact disc 34 (or, alternatively a digital video disc), about a representatively vertical axis 46 and includes a carrying member 48 having a generally disc-shaped central portion 50 with an upstanding central cylindrical hub 52. As illustrated, the hub 52 grippingly extends upwardly through the central circular opening 32 in the compact disc 34, with the compact disc 34 resting atop the central carrying member portion 50. The upper end of the motor-driven spindle 26 is coaxially secured to the bottom side of the carrying member central portion 50.

Coaxially and outwardly circumscribing the central carrying member portion 50 is an annular band 53 secured to the periphery of the carrying member portion 50 by a spaced series of circumferentially sloped blade members 54 extending radially between the band 53 and the periphery of the carrying member portion 50. During driven rotation of the compact disc 34, as indicated by the arrows 56 in FIG. 2A, the rotating inclined blades 54 create within the base housing 12 (see FIG. 1) an axial flow of cooling air 58 that passes downwardly through the annular gap 60 between the periphery of the central carrying member portion 50 and the annular outer band 53.

Thus, in a manner similar to that previously described in conjunction with the data storage disc drive structure 22, the drive structure 22a creates a forced cooling air flow within the base housing 12 without substantially increasing the space requirement for the drive 22a or requiring additional housing space for a separate cooling fan structure. While the flow of cooling air 58 is shown as being downwardly directed through the annular carrying member space 60, it will be readily appreciated by those of skill in this particular art that the air flow 58 could be upwardly directed through the annular space 60, if desired, by simply reversing the slopes of the blade members 54.

Figure 2B:
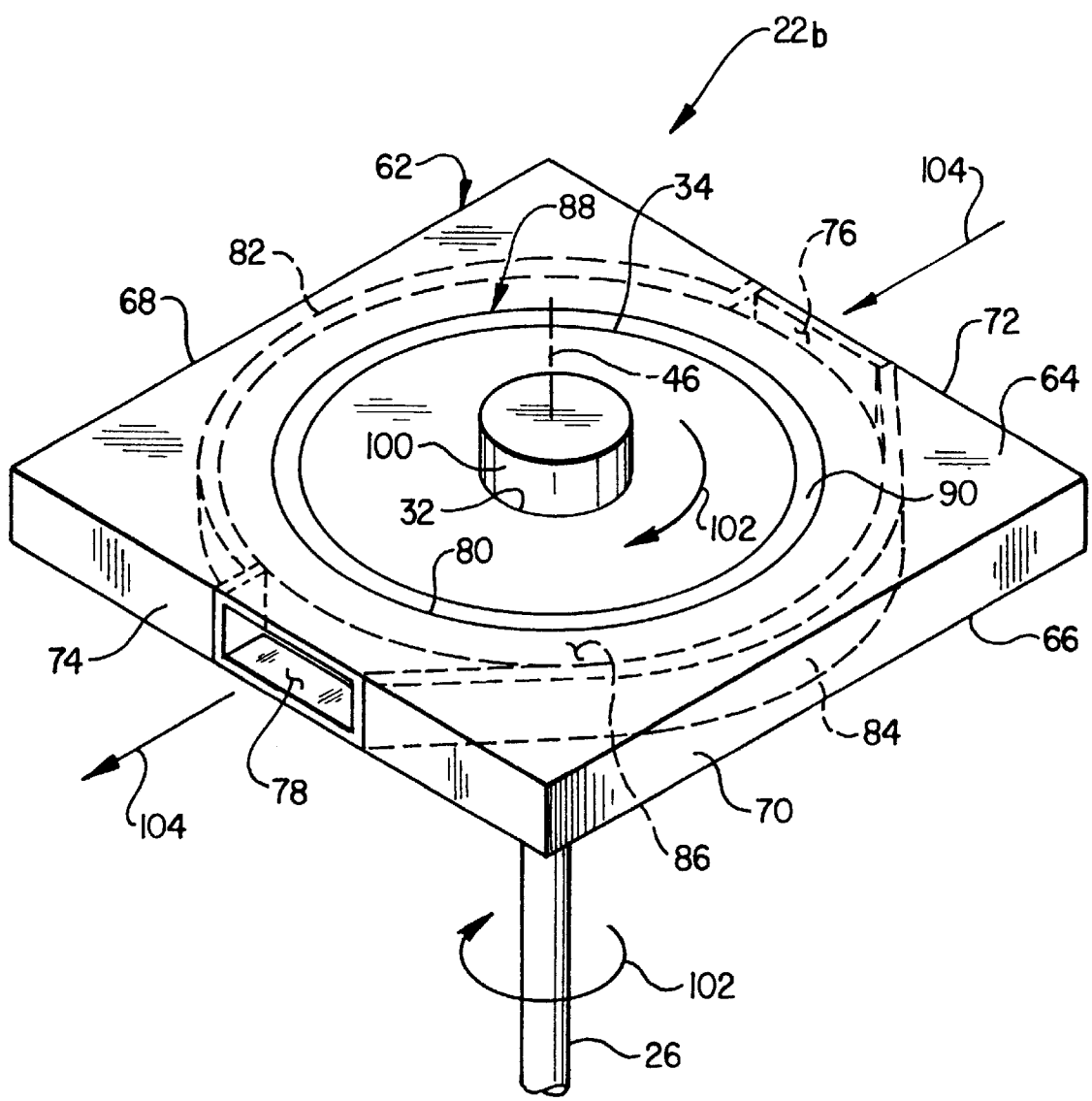
FIG. 2B is a simplified schematic perspective view of a second alternate embodiment of the disc-carrying portion of the drive structure.

Illustrated in FIG. 2B is the modified disc-carrying and rotation portion of a second alternate embodiment 22b of the previously described data storage disc drive structure 22. This portion of the modified drive 22b is used to support and rotationally drive the compact disc 34 (or, alternatively, a digital video disc or other type of data-carrying member) about a representatively vertical axis 46 and includes a stationary guide structure 62 having spaced apart, parallel rectangular top and bottom side walls 64 and 667, a first pair of opposite side edge walls 68 and 70, a second pair of opposite side edge walls 72 and 74 respectively having inlet and outlet openings 76 and 78 therein, and a circular opening 80 formed in the top side wall 64.

Opposing arcuate interior side walls 82 and 84 extend perpendicularly to the top and bottom side walls 64 and 66 and are spaced outwardly from the periphery of the circular top side wall opening 80. Arcuate walls 82 and 84 define within the interior of the stationary guide structure 62 a generally circular chamber 86 that open outwardly through the inlet and outlet openings 76 and 78.

Figure 3:
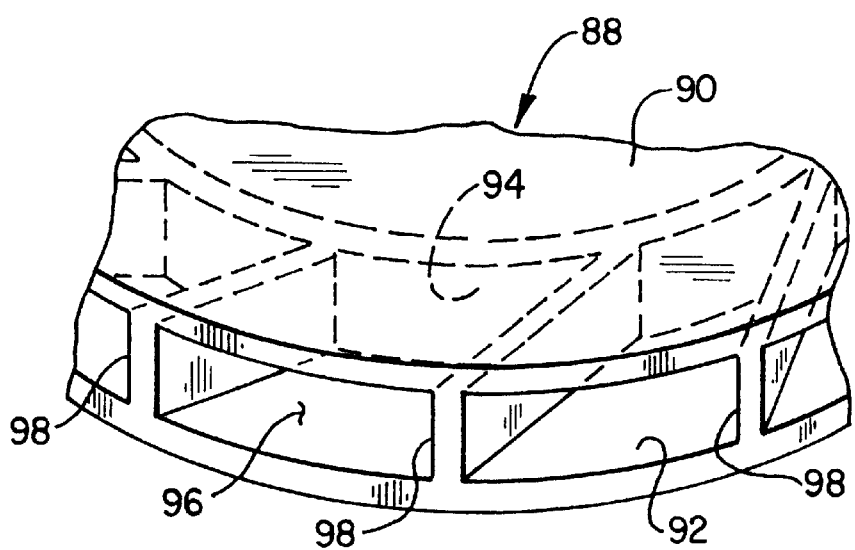
FIG. 3 is an enlarged scale perspective view of a portion of the disc-carrying member shown in FIG. 2B.

With reference now to FIGS. 2B and 3, the modified drive structure 22b also includes a generally disc-shaped carrying member 88 which is journaled within the chamber 86 for driven rotation about the vertical axis 46. Carrying member 88 includes spaced apart, parallel circular top and bottom walls 90 and 92 which are joined by a circular interior wall 94 (see FIG. 3) radially inset from the peripheries of the top and bottom walls 90, 92 and forming therewith an annular peripheral chamber 96 in the carrying member 88.

A spaced series of circumferentially sloped centrifugal blade members 98 are disposed within the chamber 96 and interconnect the circular interior wall 94 and peripheral portions of the top and bottom walls 90 and 92. The top wall 90 has an upwardly projecting central cylindrical hub 100 thereon (see FIG. 2B) which, with the compact disc 34 resting atop the top side wall 90 and the periphery of the disc 34 spaced inwardly from the edge of the circular top wall opening 80, grippingly extends upwardly through the central opening 32 in the supported compact disc 34. The upper end of the drive spindle 26 is coaxially secured to the lower side of the bottom wall 92 of the carrying member 88.

Motor-driven rotation of the spindle 26 rotates the carrying member 88, and thus the supported compact disc 34, about the axis 46 relative to the stationary guide structure 62 as indicated by the arrows 102 in FIG. 2B. This driven rotation of the carrying member 88, via its centrifugal fan blade portions 98 (see FIG. 3) creates within the base housing 12 (FIG. 1) a forced flow of cooling air 104, transverse to the axis 46, which enters the interior guide structure chamber 86 through the inlet opening 76 (see FIG. 2B) and exits the chamber 86 through the outlet opening 78 as indicated.

Accordingly, in a manner similar to that previously described in conjunction with the drives 22 and 22a, the data storage disc drive 22b creates a forced cooling air flow within the base housing 12 without substantially increasing the space requirement for the drive structure 22b or requiring additional housing space for a separate cooling fan structure.

As previously stated herein, it will be readily appreciated by those of skill in this particular art, that principles of this invention, in addition to being applicable to the support and operative rotation of compact discs, could also be advantageously utilized in conjunction with the support and operative rotation of other types of data-carrying members, such as digital video discs (DVD'S) and the disc portions of floppy and hard drives, by engaging the data-carrying member with a rotating drive structure, and using a portion of the rotating drive structure to interact with adjacent air and create a cooling air flow therefrom.

The foregoing detailed description is to be clearly understood as being given by way of illustration and example only, the spirit and scope of the present invention being limited solely by the appended claims.

What is claimed is:

1. A method of rotating a data-carrying member about a rotational axis circumscribed by a peripheral portion of the data-carrying member, said method comprising the steps of:

engaging the data-carrying member with a rotating drive structure along a common plane; and using a radially outlying portion of the rotating drive structure to interact with adjacent air and create a cooling air flow through the radially outlying portion, said cooling air flow being axially directed in an annular pattern outwardly circumscribing the peripheral portion of the engaged data-carrying member.

2. Apparatus for rotating a data-carrying member about a rotational axis circumscribed by a peripheral portion of the data-carrying member, said apparatus comprising:

a drive structure having a rotatable portion for engaging the data-carrying member along a common plane and rotating it about the rotational axis; and blade members carried by said rotatable portion at a radially outlying position and operative in response to rotation thereof to create a cooling flow of air through the rotatable portion at the radially outlying position which is axially directed in an annular pattern outwardly circumscribing the peripheral portion of the engaged data-carrying member.

3. Apparatus for operatively rotating a data storage disc, comprising:

a carrying structure for supporting the data storage disc, said carrying structure being generally disc-shaped and having first and second opposite sides, a central circular portion for supporting the data storage disc, and an annular peripheral portion positioned to circumscribe the supported data storage disc and be radially disposed entirely outwardly of the supported data storage disc;

a drive mechanism for rotating the carrying structure, and the supported data storage disc, about a rotational axis; and blade members disposed on said carrying structure and operative to create a cooling flow of air in response to rotation of said carrying structure, said blade members being carried on said annular peripheral portion and being operative to force said cooling flow of air through said annular peripheral portion in response to rotation of said carrying structure, said cooling flow of air, during its traversal of said carrying structure, being entirely disposed radially outwardly of the supported data storage disc.

4. The apparatus of claim 3 wherein:

said cooling flow of air has a generally annular configuration, circumscribes said rotational axis, and axially extends through said first and second opposite sides of said carrying structure.

5. The apparatus of claim 4 wherein:

said central circular portion of said carrying structure has an outer peripheral edge surface, said carrying structure includes an annular outer band portion outwardly circumscribing said outer peripheral edge surface in a radially spaced relationship therewith, and said blade members are positioned in a circumferentially spaced array between and interconnect said outer peripheral edge surface and said annular outer band portion.

6. In an electronic device having a drive structure on which a data-carrying member having a periphery may be supported on one of two opposite sides of a carrying structure for driven rotation therewith about an axis circumscribed by the periphery Of the data-carrying member, a method of creating a cooling air flow within the device, said method comprising the steps of:

providing blade members on the carrying structure; and using said blade members to create the cooling air flow in response to driven rotation of the carrying structure, said using step being performed in a manner such that the cooling air flow travels from one side of the supported data-carrying member to the other side thereof in a pattern centered about said axis and radially positioned entirely outwardly of the supported data-carrying member.

7. The method of claim 6 wherein:

said step of using said blade members is performed in a manner such that said cooling air flow axially travels through each of said two opposite sides of said carrying structure.

8. A computer comprising:

a housing portion; and a drive structure disposed in said housing portion and including:

a carrying structure for supporting a data storage disc, said carrying structure being generally disc-shaped and having first and second opposite sides, a central circular portion for supporting the data storage disc, and an annular peripheral portion positioned to circumscribe the supported data storage disc and be radially disposed entirely outwardly of the supported data storage disc;

a drive mechanism for rotating the carrying structure, and the supported data storage disc, about a rotational axis, and blade members disposed on said carrying structure and operative to create a cooling flow of air in said housing portion in response to rotation of said carrying structure, said blade members being carried on said annular peripheral portion and being operative to force said cooling flow of air through said annular peripheral portion in response to rotation of said carrying structure, said cooling flow of air, during its traversal of said carrying structure, being entirely disposed radially outwardly of the supported data storage disc.

9. The computer of claim 8 wherein:

said cooling flow of air has a generally annular configuration, circumscribes said rotational axis, and axially extends through said first and second opposite sides of said carrying structure.

10. The computer of claim 9 wherein:

said central circular portion of said carrying structure has an outer peripheral edge surface, said carrying structure includes an annular outer band portion outwardly circumscribing said outer peripheral edge surface in a radially spaced relationship therewith, and said blade members are positioned in a circumferentially spaced array between and interconnect said outer peripheral edge surface and said annular outer band portion.

\* \* \* \* \*